US012340215B2

(12) United States Patent
Shah et al.

(10) Patent No.: US 12,340,215 B2
(45) Date of Patent: Jun. 24, 2025

(54) AUTOMATED COMPLIANCE AND ARTIFACT GENERATION FOR REGULATORY SOFTWARE CHANGE MANAGEMENT POLICIES

(71) Applicant: Optum, Inc., Minnetonka, MN (US)

(72) Inventors: Mehulkumar Sharadchandra Shah, Colonia, NJ (US); Rajitha Ramasayam, Liberty Hill, TX (US); Jason C. Pollard, Sheffield, IL (US); Vu Van Toan Tai, San Jose, CA (US); Jun Ho Choi, Mount Prospect, IL (US); Michelle Midboe, Shorewood, MN (US)

(73) Assignee: Optum, Inc., Minnetonka, MN (US)

( * ) Notice: Subject to any disclaimer, the term of this patent is extended or adjusted under 35 U.S.C. 154(b) by 141 days.

(21) Appl. No.: 18/172,990

(22) Filed: Feb. 22, 2023

(65) Prior Publication Data
US 2024/0281248 A1    Aug. 22, 2024

(51) Int. Cl.
*G06F 8/77*    (2018.01)
(52) U.S. Cl.
CPC ...................... *G06F 8/77* (2013.01)
(58) Field of Classification Search
CPC ........................................................ G06F 8/77
See application file for complete search history.

(56) References Cited

U.S. PATENT DOCUMENTS

| 8,028,269 | B2 | 9/2011 | Bhatia et al. |
| 8,479,161 | B2 | 7/2013 | Weigert |
| 8,874,400 | B2 | 10/2014 | Manfredi |
| 9,087,120 | B2 | 7/2015 | Hahn et al. |
| 9,767,001 | B2 | 9/2017 | Wong et al. |
| 11,281,568 | B2 | 3/2022 | Villani |
| 2004/0243260 | A1* | 12/2004 | Law .................. G06Q 10/10 700/86 |
| 2009/0124374 | A1* | 5/2009 | Patel .................. G07F 17/32 463/29 |
| 2009/0298576 | A1* | 12/2009 | Nguyen .................. G07F 17/32 463/25 |

(Continued)

FOREIGN PATENT DOCUMENTS

| JP | 2014089704 A | * 5/2014 | ............ G06F 11/323 |
| WO | 2020212938 A1 | 10/2020 | |

OTHER PUBLICATIONS

Kellogg et al., "Continuous Compliance" (Year: 2020).*

(Continued)

*Primary Examiner* — Phillip H Nguyen
(74) *Attorney, Agent, or Firm* — Shumaker & Sieffert, P.A.

(57) ABSTRACT

A computing system may produce standardized compliance reports that may contains change requirements, test and security results, and approvals with validation and attaching the compliance report to change tickets. Compliance Automation application programming interface (API) into a software change workflow interface may enable the compliance reports to be constructed by software engineering teams while they use the software change workflow interface. The system may enable software engineering teams to generate a standardized software change management compliance reports that have a uniformity that helps auditors reviewing process.

20 Claims, 10 Drawing Sheets

(56) References Cited

U.S. PATENT DOCUMENTS

2019/0230129 A1\* 7/2019 Digiambattista ... H04L 63/1441
2019/0286825 A1 9/2019 Ponnuru et al.

OTHER PUBLICATIONS

DevX-Admin, "Use Best Practices for Keeping Your SOX in Compliance", DevX, Nov. 22, 2005, 6 pp., URL: https://www.devx.com/enterprise-zone/29991/.

Kelly, "Why IT General Controls Are Important for Compliance and Cybersecurity", Hyperproof, Mar. 24, 2022, 6 pp., URL: https://hyperproof.io/resource/it-general-controls-compliance/.

Schmitt, "Automating compliance in software delivery", Circleci Blog, Jul. 18, 2022, 7 pp., URL: https://circleci.com/blog/automate-software-delivery-compliance/.

Shiftleft Team, "Getting to Know Compliance in Software Development", Security Boulevard, Nov. 22, 2021, 6 pp., URL: https://securityboulevard.com/2021/11/getting-to-know-compliance-in-software-development/.

\* cited by examiner

| | A | B | C | D | E |
|---|---|---|---|---|---|
| 1 | | | Milestone: MI65745-RCA 2022.02, Generated at 2022-01-27 13:12:23 CT [Report ID: 14457696030-MI65745-164278160305626] | | |
| 2 | ID | Name | Acceptance Criteria | Accepted By | Accepted On |
| 3 | US4155848 | JENKINS EXAMPLE: update links, readme and pom.xml for recent log4j | Verify that the updates have been completed. | James Smith | 2022-01-19 13:25:26 CT |
| 4 | US4155930 | CODE INTEGRITY: Follow-up on Barista scan results | Verify that the Barista code issues have been cleared. | James Smith | 2022-01-19 13:25:34 CT |
| 5 | US4155933 | LOG4J: Upgrade to 2.17 | Verify that the 2.17 upgrade has been completed. | James Smith | 2022-01-11 10:38:59 CT |
| 6 | US4156005 | MICROSITE: Update Parameter Summary for Rally token changes | Verify that the Parameter Summary doc shows the Rally token parameter as not. | James Smith | 2022-01-12 10:52:19 CT |
| 7 | US4160129 | CODE QUALITY: Investigate Sonar issues (post rule update) | Verify that the SonarQube issues have been addressed. | James Smith | 2022-01-19 13:28:52 CT |
| 8 | US4160130 | CODE QUALITY: Investigate Dependabot issues | Verify that the Dependabot issues have been addressed. | James Smith | 2022-01-19 13:22:39 CT |
| 9 | US4174191 | REGRESSION TEST: Fix regression failure due to new scan in report | Verify that RCA regression test are successful using PR build. | James Smith | 2022-01-12 10:43:44 CT |
| 10 | US4183342 | SECURITY SCAN HEIMDALL - pre-changes for sunsetting fortify | Verify that Fortify warnings are displayed on report when Fortify calls are included | James Smith | 2022-01-19 11:02:35 CT |
| 11 | US4193325 | COMPLIANCE DOCS: Automate saving compliance report for compliance automation product | Verify that the repo and code has been created to save compliance messages so. | James Smith | 2022-01-19 13:31:52 CT |

Requirements | Testing | Deployment | Separation of Duties

FIG. 4A

|    | A | B | C | D | E | F | G | H | I | J |
|----|---|---|---|---|---|---|---|---|---|---|
| 1  |   |   |   | Milestone: MI65745-RCA 2022.02, Generated at 2022-01-27 13:12:23 CT | | | | | |
| 2  | System Tests | | | | | | | | | |
| 3  |   |   |   |   |   |   |   |   |   |   |
| 4  | Rally Test Cases | | | | | | | | | |
| 5  | Total Scenarios | #Executed | #Passed | #Failed | Pass Percentage | Pass Threshold | Execution Date | | | |
| 6  |   | 3 | 3 | 0 | 100.00% |   | 2019-04-09 13:15:46CT | | | |
| 7  |   |   |   |   |   |   |   |   |   |   |
| 8  | Regression | | | | | | | | | |
| 9  | Total Scenarios | #Executed | #Passed | #Failed | Pass Percentage | Pass Threshold | Execution Date | | | |
| 10 |   | 69 | 69 | 0 | 100.00% |   | 2022-01-18 13:50:23CT | | | |
| 11 |   |   |   |   |   |   |   |   |   |   |
| 12 | Security (Now includes additional scan results from Heimdall. NO IMPACT to deployment.) | | | | | | | | | |
| 13 | ASKID | Source / Tool | Test Type | Tool Record ID | Tool Record Name | Open Critical Issues | Open High Issues | Open Medium Issues | Open Low Issues | Recent Scan Date |
| 14 | UHGWM110-021901 | SonarSource/ SonarQube | SAST |   |   |   | 0 | not reported | not reported | 2022-01-18T00:00:00 |
| 15 | UHGWM110-021901 | WhiteHat/ Sentinel | DAST |   |   |   | 0 | 0 | 0 | 2021-09-26T16:37:27 |
| 16 | UHGWM110-021901 | Microfocus/ WebInspect | DAST |   |   |   | 0 | 0 | 3 | 2021-02-03T15:45:03 |

| Requirements | Testing | Deployment | Separation of Duties |

FIG. 4B

|   | A | B | C | D | E |
|---|---|---|---|---|---|
| 1 |   |   | Milestone: MI65745-RCA 2022.02, Generated at 2022-01-27 13:12:23 CT | | |
| 2 | Deployment Date: | 2022-01-21 CT |   |   |   |
| 3 | Service Now Change Ticket: | CHG1250721 |   |   |   |
| 4 | ASKID(s): | [UHGWM10-021901] | provided in RCA call |   |   |
| 5 |   |   |   |   |   |
| 6 | Approver Name | Approver Date | Approver Email | Approver MS ID | Approver Type |
| 7 | Wilson, Nancy | 2022-01-21 10:13:34 CT | Nancy_Wilson@company.com | nwilson108 | IT (Pull Request Approval) |
| 8 | Doe, Jane | 2022-01-21 10:13:34 CT | Jane_Doe@company.com | jdoe11 | IT (Pull Request Approval) |
| 9 | Smith, James | 2022-01-21 10:13:34 CT | James_Smith@company.com | jsmith55 | Business (CM1/CM2 Approval) |

| Requirements | Testing | Deployment | Separation of Duties |

FIG. 4C

| Attestation | Attestation Date and Time |
|---|---|
| For the following askId: [UHGWM110-021901]., I hereby attest the following collected information accurately reflects the Separation Of Duties information to the best of my knowledge | 2021-11-12 10:17:42 CT |
| | |
| Attester | |
| fstallone59 | |
| | |
| Source Location | Source Contributor |
| https://github.optum.com/automated-compliance/compliance-api | bbay12 |
| | |
| Prod Location | Prod Deployer |
| https://k8s-dash-prod-ctc.optum.com/#/workloads?namespace=automated-compliance | ac_deploy_user |
| https://k8s-dash-prod-elr.optum.com/#/workloads?namespace=automated-compliance | ac_deploy_user |
| | |
| Notes | |
| https://github.optum.com/automated-compliance/compliance-api not found, possible private repository | |
| | |

| Requirements | Testing | Deployment | Separation of Duties | ⊕ |

FIG. 4D

AUTOMATED COMPLIANCE AND ARTIFACT GENERATION FOR REGULATORY SOFTWARE CHANGE MANAGEMENT POLICIES

TECHNICAL FIELD

This disclosure relates to software code management.

BACKGROUND

Software development tools are programs or platforms that are used to create, test, and maintain software applications. These tools may assist developers in writing and debugging code, tracking and managing project tasks, and collaborating with team members. Source control tools enable developers to manage and track changes to their codebase. They enable multiple developers to work on the same codebase simultaneously, and help to resolve conflicts when changes overlap. Version control systems are tools that enable developers to track changes to their code over time, and collaborate with other developers on code projects. They provide features such as branching and merging, which enable developers to work on different versions of the code concurrently, and to easily integrate changes made by multiple developers into a single codebase. Project management tools are software programs that help developers plan, track, and organize the development of a software project. They can help developers assign tasks, track progress, and identify and resolve issues that arise during the development process. Continuous Integration/Continuous Deployment (CI/CD) pipeline tools are a software development tools that aim to improve the quality and speed of software development by automating the build, test, and deployment processes. Change management tools are software tools that help product owners manage, plan, schedule a software build through different stages and environments; including testing and deploying software releases.

SUMMARY

The present disclosure describes devices, systems, and methods to automatically generate a standardized compliance report. By automatically attaching requirement information, test results, reports, approvals, and compliance reports to change tickets, a system may automate and streamline at least certain portions of a regulatory compliance process. An application programming interface (API) into a software change workflow interface of a source control tool may enable the compliance reports to be constructed by software engineering teams while the software engineering teams use the software change workflow interface. The system may enable software engineering teams to automatically generate standardized compliance reports that have a uniformity that helps auditors' reviewing processes.

The system may connect with software enterprise tools to (i) gather development work items and test results, (ii) request and collect approvals, and (iii) generate a final compliance report which is (iv) automatically attached to a change management record. The disclosed change control solution may provide automated evidence gathering and documentation, validation of requirements, testing and security, and approval collection.

In one example, this disclosure describes a method comprising: producing, by a computing system, a software change workflow interface, wherein the software change workflow interface enables launching of a software compliance mode; receiving, by the computing system, an indication of user input to launch the software compliance mode; while the computing system is in the software compliance mode: receiving and storing, by the computing system, requirement information used for a compliance process; producing an initial compliance report that includes the requirement information, the initial compliance report indicating pre-approval compliance of changes to a codebase with policy requirements; initiating, by the computing system, an approval process; determining, by the computing system, a completion of the approval process; and based on the determining of the completion of the approval process, producing and storing, by the computing system, a final compliance report including the requirement information, the final compliance report indicating compliance of the changes to the codebase with the policy requirements.

In another example, this disclosure describes a computing system comprising: a communication unit configured to connect with a network; and one or more processors implemented in circuitry and in communication with the communication unit, the one or more processors configured to: produce a software change workflow interface, wherein the software change workflow interface enables launching of a software compliance mode; receive an indication of user input to launch the software compliance mode; while the computing system is in the software compliance mode: receive and store requirement information used for a compliance process; produce an initial compliance report that includes the requirement information, the initial compliance report indicating pre-approval compliance of changes to a codebase with policy requirements; initiate an approval process; determine a completion of the approval process; and based on the determining of the completion of the approval process, produce and store a final compliance report including the requirement information, the final compliance report indicating compliance of the changes to the codebase with the policy requirements.

In another example, this disclosure describes a non-transitory computer-readable medium having instructions stored thereon that, when executed, cause one or more processors to: produce a software change workflow interface, wherein the software change workflow interface enables launching of a software compliance mode; receive an indication of user input to launch the software compliance mode; while the computing system is in the software compliance mode: receive and store requirement information used for a compliance process; produce an initial compliance report that includes the requirement information, the initial compliance report indicating pre-approval compliance of changes to a codebase with policy requirements; initiate an approval process; determine a completion of the approval process; and based on the determining of the completion of the approval process, produce and store a final compliance report including the requirement information, the final compliance report indicating compliance of the changes to the codebase with the policy requirements.

The details of one or more examples are set forth in the accompanying drawings and the description below. Other features, objects, and advantages will be apparent from the description, drawings, and claims.

BRIEF DESCRIPTION OF THE DRAWINGS

FIGS. 4A-4D are diagrams that illustrate an example software compliance report in accordance with one or more aspects of this disclosure.

DETAILED DESCRIPTION

Figure 1:
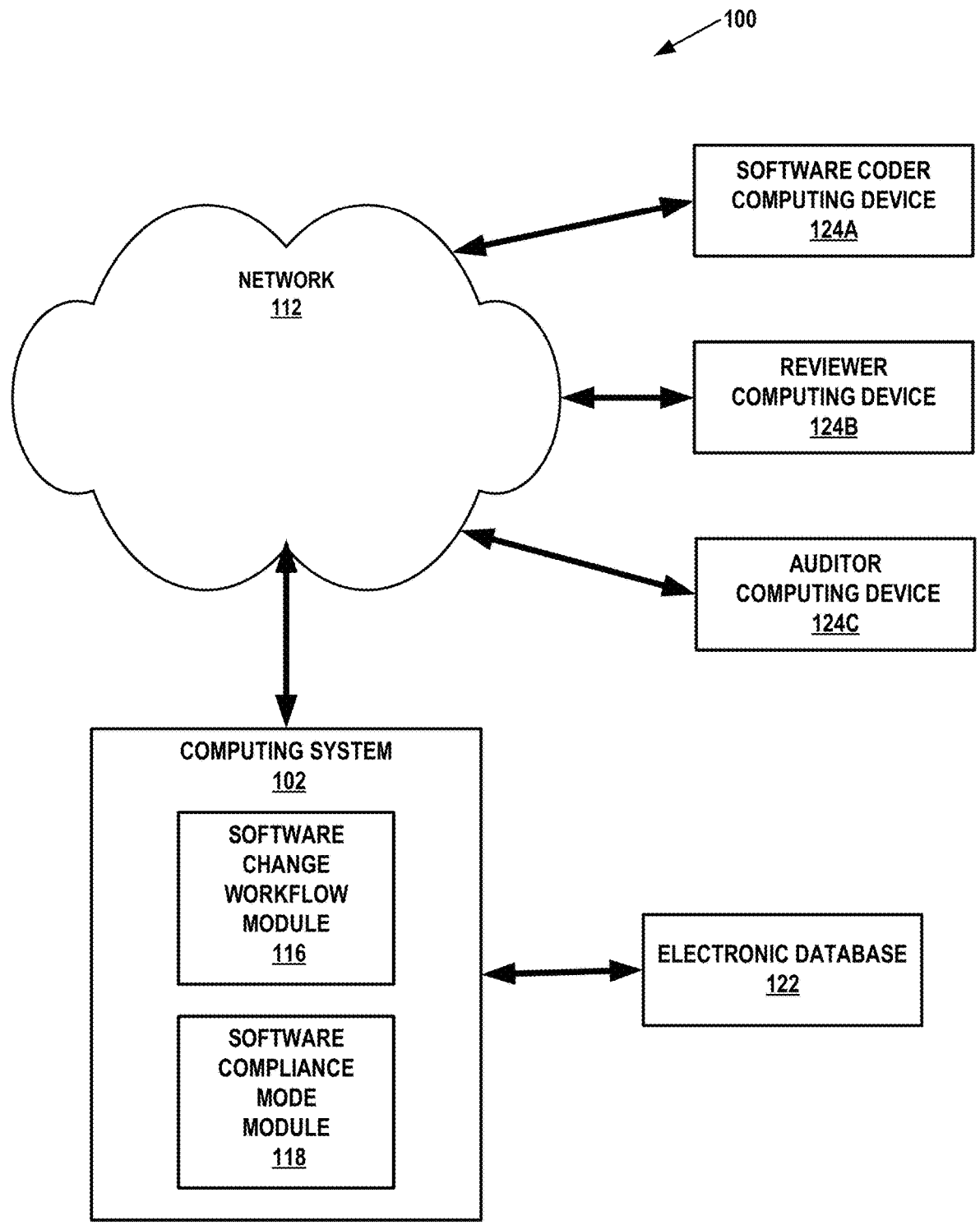
FIG. 1 is a block diagram illustrating an example environment including a computing system that implements a software change workflow and software compliance, in accordance with one or more aspects of this disclosure.

In the wake of the 2002 Enron scandal, the United States Congress comprehensively reformed financial regulations for publicly held companies. By passing the Sarbanes-Oxley (SOX) Act, Congress aimed to improve the accuracy and reliability of financial disclosures and increase penalties for corporate fraud. Software updates often came under the requirements of SOX because software updates often affect the financials or financial reporting of companies.

The passage of SOX motivated companies across the U.S. to strengthen and broaden their corporate compliance initiatives. As part of their compliance with the Sarbanes-Oxley Act (SOX), publicly traded companies in the US are required to establish and maintain internal controls over financial reporting. This includes controls related to software changes that could affect financial reporting. Software change management is a critical part of SOX compliance, because software change management helps ensure that changes to financial systems and processes are properly documented, tested, and approved before they are implemented. This helps prevent errors or fraud and ensures that financial statements are accurate and reliable. In addition to SOX requirements, many corporations instituted change management policies covered by general information technology controls (GITC) intended to mitigate the risks that could hinder the company.

Compliance reports may describe a change in the software code that was made and may include requirement information describing change requirements, test results that indicate some sort of review of the software change before the change was added to the codebase, and security scans. Compliance reports may also be approved and accepted by an appropriate party, such as a software engineer or manager other than those who made or are responsible for the software change, before the compliance report is finalized.

Compliance policies require software engineers to document, test, and gain approval before each code deployment. The compliance requirements may be quite tedious, cumbersome, and time-consuming with software engineering teams often spending many hours addressing the regulatory compliance requirements for a change ticket. Haphazard implementation of compliance requirements is often the norm and the lack of standardization may result in a variety of compliance report formats and styles that may be cause auditing the compliance reports difficult. As more companies adopt the fast pace of continuous deployment, the pressure to rapidly release code leaves little time for this compliance process.

Frequently, compliance requirements fall through the cracks, leaving companies exposed to significant risk. Unable to meet the demand of this administrative burden, many teams do not create compliance reports. Without these reports, deployments violate change management policies and generate auditor findings (a deficiency the auditor is required to report), if audited. Another form of non-compliance is proceeding with the deployment without approval. Many companies lack a systematic control to ensure appropriate approvals have been secured prior to deployment. After-the-fact approvals are non-compliant and may lead to an auditor finding and potential report to authorities. Even when teams are compliant, the teams often cannot produce proof on past deployments. Despite their efforts, they may be considered non-compliant and hit with an auditor finding. Complying with change management policies is especially crucial for application development teams covered by GITC.

Often, each team follows their own process and methods to prepare a compliance report and collect approvals. This inconsistency leads to non-standard outcomes that do not share a common process, look, or feel. As a result, auditors must prolong their investigations to delve into a team's individual change management practices. The lack of a consistent process not only decreases auditor confidence, but it also increases the likelihood of findings of non-compliance.

Manually compiling compliance reports is inefficient and ineffective. The work involved may skyrocket with an increase in deployment frequency. Adding another layer of administrative burden, teams must also spend significant time manually maintaining and attesting approver lists, storing reports and keeping track of approvals. When audited, teams must have the ability to easily retrieve reports and approvals as evidence of compliance. Without automation, teams invest substantial time to provide proof of compliance on past deployments to fulfill an evidence request. These inefficiencies create an administrative burden in the deployment process and may block increasing the frequency of deployments.

Automated compliance report production may enable interactions between a variety of systems that would otherwise be siloed, including software tools, IAM systems, test systems, and security scan systems. This can help to improve the overall efficiency and effectiveness of compliance processes by enabling the integration and sharing of information between different systems. Automated compliance report production can help to ensure that compliance reports are accurate and up to date since the system may pull data from various sources and ensure that it is consistent and correct. Automated compliance report production can help to reduce errors by automating the creation and distribution of compliance reports. Automated compliance report production may also produce standardized reports that may be ingested by other computer systems in a standardized way increasing the interconnectability of computer systems.

In accordance with one or more techniques of this disclosure, systems and methods are described that generate compliance reports, such as standardized compliance reports. A compliance process may be invoked from a software change workflow interface, such as an interface of a software development or project tool (e.g., a source control tool, Continuous Integration/Continuous Deployment tool, project management tool, etc.). An application programming interface (API) may enable the automatic generation of such standardized reports in a software compliance mode. The API enables the functionality to be incorporated with current software change workflow interfaces as well as future systems.

Systems and methods are described that interact with such tools to gather development work items, requirement information, test results and security scans, request and collect approvals, and generate a final compliance report which is attached to a change management record, such as for a pull request and/or change ticket. Source control tools often use change tickets and pull requests to keep track of changes. A change ticket is a record of a problem or requested change in a software application. A change ticket may include a detailed description of the issue or change, as well as information about the priority and status of the ticket. Change tickets are often used to track and manage the work that needs to be done on a software project, and may be created and assigned to team members for resolution. A pull request is a request for a team member to review and merge code changes into a shared code repository. Multiple developers may be working on the same codebase simultaneously and the pull requests help avoid conflicts. When a developer has made changes to the code, the developer may create a pull request to submit their changes for review by other team members. The review process enables team members to discuss and review the changes, and decide whether to accept or reject the pull request. If the changes are accepted, they are merged into the main codebase.

The computing system may pull requirement information, user stories, defects, test results, and security scans from a software development or project tool. The computing system may store such obtained information (e.g., requirement information, user stories, defects, test results, and security scans) as well as generated information such as compliance reports using automated artifact retention. The computing system may assemble test results in a defined format, produce summary, and validate test results according to standards, such as a user-defined pass/fail threshold. The computing system may incorporate code security scan results in addition to the standard software development life cycle documentation so that approvers have visibility to code vulnerabilities when reviewing and approving the deployment. The computing system may assemble the security scans results with actions and validate the security scans results.

The computing system may send email notifications to selected approvers with scheduled reminders until the request has been approved or denied. The computing system may use such information to generate a standardized, tampered proof compliance report which the computing system associates with a software change, such as being attached to a change ticket in a change management system.

The computing system may manage approvers via an access control system (e.g., Active Directory, Lightweight Directory Access Protocol (LDAP), Microsoft Windows' Group Policy, or Access control lists) using an identity and access management (IAM) system that defines secure groups. The IAM system may be linked to in order to validate that requirement and deployment approvers are authorized to manage authorized approver lists. The computing system may retrieve production integrity (a.k.a. separations of duties) related information for the authorized approver lists and validate these authorized approver lists. A key provision of SOX is the requirement for separation of duties such that different individuals or groups within an organization are responsible for different aspects of financial reporting and control to help ensure the integrity and reliability of the financial information. In the context of the software compliance process, separation of duties may be interpreted such that approvers are not to be on the team responsible for a software change (or for associated with the software application being changed). The computing system may maintain approver lists that follow separation of duties by checking possible approvers versus a list of developers associated with the software change or the software application as a whole. The system may thus check using the IAM system to ensure requirement and deployment approvers are valid and leverage the IAM system to identify valid business and IT approvers to demonstrate compliance with deployment best practices. The system may enable such permissions and valid approvers to be reviewed periodically.

The computing system may identify an approval from another system and use this approval as a proxy approval for the compliance process. For example, the computing system may also collect deployment approvals. Deployment approval may refer to the process of reviewing and approving changes to a software system, such as from a software development or project tool before the changes are implemented in a production environment. Deployment approvals may ensure that changes to the system are thoroughly tested, meet the required standards, and do not introduce any issues that could negatively impact the stability or functionality of the system. In some situations, especially with mature software projects, such deployment approvals may suffice for compliance approval. If such a proxy approval is not available or fails, the computing system may fall back to requesting manual approval.

One or more techniques of this disclosure addresses the problem of non-compliance by simplifying and automating the often-burdensome compliance process and ensure compliance. In one example, software development teams may be restricted from moving forward with a deployment until they have secured approvals and generated and stored compliance artifacts. The standardized and automated process solves the inconsistency problem and removes inefficiencies by automating report creation, approval management, and artifact retention. The standardized and automated process may increase auditors comfort in the compliance process as a whole and the system may be considered sufficiently designed and monitored such that participating software applications may be exempt from certain independent testing requirements. By automatically attaching requirement information, test results, security scans, reports, approvals, and compliance reports to change tickets, the system automates and streamlines the entire compliance process. Such automation lifts the compliance burden off engineers, enabling them to focus on what they do best.

The system may:
Automate evidence collection with validation and approval against standards
Gather associated requirements, validate and ensure authorized acceptance
Assemble any type of test results in defined format
Produce summary, and validate to standards including user-defined pass/fail threshold
Assemble standardized security scans results with actions and validate;
Creating a new way to enrich compliance reports, retrieve production integrity (a.k.a. separations of duties) related information and validate
Collect deployment approvals
Approve compliance in new ways
Commandeer agile acceptance as requirements and testing compliance approval leverage identity and access management (IAM) to validate that requirement and deployment approvers are authorized. (IAM may be used to manage authorized approver lists)

Automate deployment approvals leveraging upstream approvals as a proxy

Previous systems may be insufficient to prove information technology general controls (ITGC) compliance as they don't capture change or test details, or requirement and business deployment approvals. Techniques of the present described systems may provide automated evidence gathering and documentation, validation of requirements, testing and security; and approval collection. Other known solutions collect varying degree of evidence, are narrowly focused and/or operate primarily in the security/risk space.

FIG. 1 is a block diagram illustrating an example environment including a computing system that implements a software change workflow and software compliance, in accordance with one or more aspects of this disclosure. In the example of FIG. 1, environment 100 includes computing system 102 that may implement software change workflow module 116 and software compliance mode module 118.

Environment 100 also includes additional devices 124A, 124B, and 124C (collectively, "devices 124") that interact with computing system 102. Devices 124 include software coder computing device 124A, reviewer computing device 124B and auditor computing device 124C. Devices 124 communicate with computing system 102, e.g., via network 112. Software coder computing device 124A may be used to make changes to a software codebase and to initiate a software compliance mode. A reviewer may use reviewer computing device 124B to review and approve compliance reports as discussed below. An auditor may use auditor computing device 124C to audit the final compliance reports to ensure that the software code or deployment is in compliance. Devices 124 may use computing system 102 as a server or as a cloud computing service.

Network 112 may comprise a public network, such as the Internet, or a private network. Although illustrated as a single entity, network 112 may comprise a combination of public and/or private networks. In some examples, network 112 may comprise one or more of a wide area network (WAN) (e.g., the Internet), a local area network (LAN), a virtual private network (VPN), or another wired or wireless communication network.

Computing system 102 and additional devices 124 may include any device configured to receive, process, and/or send electronic, digital, and/or computer information. For example, computing system 102 and/or additional devices 124 may include any or all types of computing devices such as desktop or laptop computers, mobile devices, smartphones, smartwatches, smart glasses, or any smart devices, tablet computers, wearable devices, servers, intermediate network devices, workstations, vehicle computing systems or on-board computers, or the like.

In accordance with one or more techniques of this disclosure, computing system 102 may receive an API call including software application, deployment, and change identifiers, such as from an interface of software change workflow module 116. Computing system 102 may use the indicators to obtain work items, requirement information, test results and security results from a software development tool, such as software change workflow module 116. Computing system 102 may run automated checks and validations on the work items, requirement information, test results and security results and may produce an initial compliance report. Computing system 102 may send the initial compliance report in approval notices to identified approvers; and if necessary, may send periodic reminders to identified approvers. Computing system 102 may collect the approvals from the identified approvers and may generate a final compliance report including the approvals. Computing system 102 may attach the final compliance report to a change management record, such as for a pull request and/or change ticket.

Computing system 102 may produce a software change workflow interface, such as from software change workflow module 116, to enable a user to make changes to a codebase of a software product. Software change workflow module 116 may be a software development or project tool (e.g., a source control tool, Continuous Integration/Continuous Deployment tool, project management tool, etc.). The interface of the software change workflow module 116 may enable the launching of software compliance mode module 118 with computing system 102 receiving an indication of user input to launch of the software compliance mode.

Software change workflow module 116 may send identifiers (e.g., software application, deployment, and change identifiers) and/or other information to software compliance mode module 118 to enable software compliance mode module 118 to start the compliance process. While computing system 102 is in the software compliance mode, computing system 102 may receive and store test results needed for a compliance process. The test results may be produced by software change workflow module 116, such as from a CI/CD pipeline tool that does automated testing. Continuous Integration/Continuous Deployment (CI/CD) pipeline tools are a software development practice that aims to improve the quality and speed of software development by automating the build, test, and deployment processes. A CI/CD pipeline is a series of automated processes that are connected together to enable the rapid and reliable delivery of software updates. The CI/CD pipeline tool may include Continuous Integration where developers frequently integrate code changes into a shared repository, Automated Testing where the pipeline automatically triggers a series of tests to ensure that the code is working as expected and does not break any existing functionality, Deployment where, if the tests pass, the CI/CD tool deploys the code changes to a staging or production environment, and Monitoring where the deployed code is monitored to ensure that the deployed code is functioning correctly and meets the desired performance and reliability standards. Continuous Integration/Continuous Deployment (CI/CD) pipeline tools may enable Agile software practices.

Computing system 102 may produce an initial compliance report that includes requirement information. The requirement information may be text that describes the software change, the software, software operations, changes to the software operation or other requirement information. Computing system 102 may obtain requirement information from a software tool, such as a requirements tool.

The initial compliance report may indicate pre-approval compliance of the changes to the codebase with policy requirements. The initial compliance reports may be compliance reports that are ready for approval. Final compliance reports may be compliance reports that have obtained the required approvals.

Computing system 102 may send a message to a reviewer to request approval of the initial compliance report. The message may enable the reviewer to access to the initial compliance report.

Computing system 102 may receive an indication of approval from the reviewer. Based on receiving the indication of approval from the reviewer, computing system 102 may produce and store a final compliance report along with the requirement information. The final compliance report may indicate compliance of the changes to the codebase with the policy requirements.

While computing system 102 is in the software compliance mode, computing system 102 may use application programming interface (API) to produce the initial compliance report and the final compliance report from the software change workflow interface. Software change workflow module 116 may initiate the software compliance mode, obtain necessary data for the compliance report, produce an initial compliance report, obtain approvals and produce the final compliance report.

Software change workflow module 116 may be a tool, such as a CI/CD pipeline tool, that enables Agile software development. Software compliance mode module 118 may enables the production of the final compliance report along with the requirement information as part of the Agile software development. For example, as discussed with respect to FIG. 5A, below, requirements tools 550 may automate the execution and tracking of tasks in Agile software development. Software change workflow module 516 may interact with requirements tools 550 to obtain data for the compliance reports and, in some cases, software change workflow module 516 may leverage requirement tools' functionality during the approval process. Further, software change workflow module 516 may make the process of producing compliance reports easier making rapid updates desired in Agile software development more feasible.

Computing system 102 may produce the final compliance report according to a standardized format that computing system 102 uses to produce other final compliance reports. In other words, the final compliance reports may have its information arranged in a standard way (such as arranged using in tabs, columns etc.). An example standard layout is shown in FIGS. 4A-4D discussed below. In this way, auditor review of final compliance reports is made easier. Computing system 102 may enable an authorized auditor to access the final compliance report along with other final compliance reports in a review interface.

The changes to the codebase may relate to change tickets for the changes. Computing system 102 may produce and store the final compliance report associated with the change tickets. Computing system 102 may produce a page for the change ticket that enables the final compliance report to be accessed. For example, the final compliance report may be provided to change management tool 552 shown in FIG. 5A discussed below. The change management tool 552 may associate the final compliance report with the change ticket so when a page for the change ticket is brought up in change management tool 552, the final compliance report may be accessed, such as with a link. The changes to the codebase may relate to a pull request that initiates a process of merging new software code changes with the codebase in a main software project repository. Computing system 102 may produce and store the final compliance report associated with the pull request. Computing system 102 may produce a page for the pull request that enables the final compliance report to be accessed.

Computing system 102 may authenticate reviewers before allowing the reviewer to approve the initial compliance report. Computing system 102 may use an identity and access management (IAM) system, such as IAM system 570 shown in FIG. 5A discussed below, to authenticate reviewers. Computing system 102 may maintain or use approver lists or groups that follow separation of duties by checking possible approvers versus a list of developers associated with the software change or the software application as a whole. Computing system 102 may thus check using the IAM system to ensure requirement and deployment approvers are valid and leverage the IAM system to identify valid business and IT approvers to demonstrate compliance with deployment best practices. Computing system 102 may enable such permissions and valid approvers to be reviewed periodically In addition to test results, computing system 102 may receive and store additional documents, such as security scans, user stories identifiers etc. The final compliance report may be associated with the additional documents.

Figure 2:
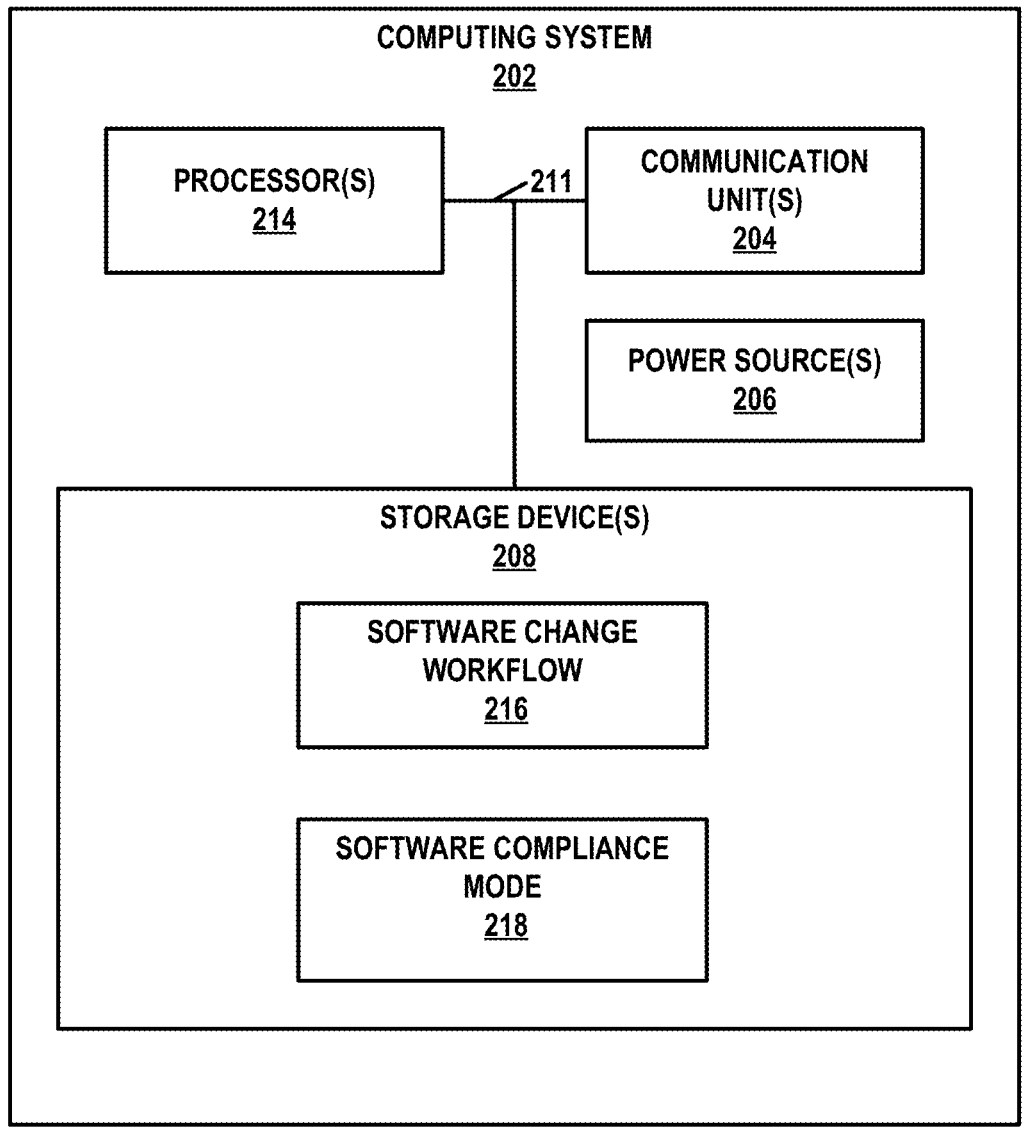
FIG. 2 is a block diagram illustrating an example computing system that implements a software change workflow and software compliance, in accordance with one or more aspects of this disclosure.

FIG. 2 is a block diagram illustrating an example computing system that implements a software change workflow and software compliance, in accordance with one or more aspects of this disclosure. FIG. 2 illustrates only one example of computing system 202, without limitation on many other example configurations of computing system 202, and may comprise a separate system of one or more computing devices.

As shown in the example of FIG. 2, computing system 202 includes one or more processors 214, one or more communication units 204, one or more power sources 206, one or more storage devices 208, and one or more communication channels 211. Computing system 202 may include other components. For example, computing system 202 may include input devices, output devices, display screens, and so on. Communication channels 211 may interconnect each of processors 214, communication units 204, and storage devices 208 for inter-component communications (physically, communicatively, and/or operatively). In some examples, communication channels 211 may include a system bus, a network connection, an inter-process communication data structure, or any other method for communicating data. Power sources 206 may provide electrical energy to processors 214, communication units 204, storage devices 208 and communication channels 211. Storage devices 208 may store information used for use during operation of computing system 202

Processors 214 comprise circuitry configured to perform processing functions. For instance, one or more of processors 214 may be a microprocessor, an application-specific integrated circuit (ASIC), a field-programmable gate array (FPGA), or another type of processing circuitry. In some examples, processors 214 of computing system 202 may read and execute instructions stored by storage devices 208. Processors 214 may include fixed-function processors and/or programmable processors. Processors 214 may be included in a single device or distributed among multiple devices.

Communication units 204 may enable computing system 202 to send data to and receive data from one or more other computing devices (e.g., via a communications network, such as a local area network or the Internet). In some examples, communication units 204 may include wireless transmitters and receivers that enable computing system 202 to communicate wirelessly with other computing devices. Examples of communication units 204 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing system 202 may use communication units 204 to communicate with one or more other computing devices or systems, such as electronic database 122. Communication units 204 may be included in a single device or distributed among multiple devices.

Processors 214 may read instructions from storage devices 208 and may execute instructions stored by storage devices 208. Execution of the instructions by processors 214 may configure or cause computing system 202 to provide at least some of the functionality ascribed in this disclosure to computing system 202. Storage devices 208 may be included in a single device or distributed among multiple devices.

As shown in the example of FIG. 2, storage devices 208 may include computer-readable instructions associated with software change workflow module 216 and software compliance mode module 218, corresponding to software change workflow module 116 and software compliance mode module 118 of FIG. 1. software change workflow module 216 and software compliance mode module 218 shown in the example of FIG. 2 is presented for purposes of explanation and may not necessarily correspond to actual software units or modules within storage device 208.

Figure 3:
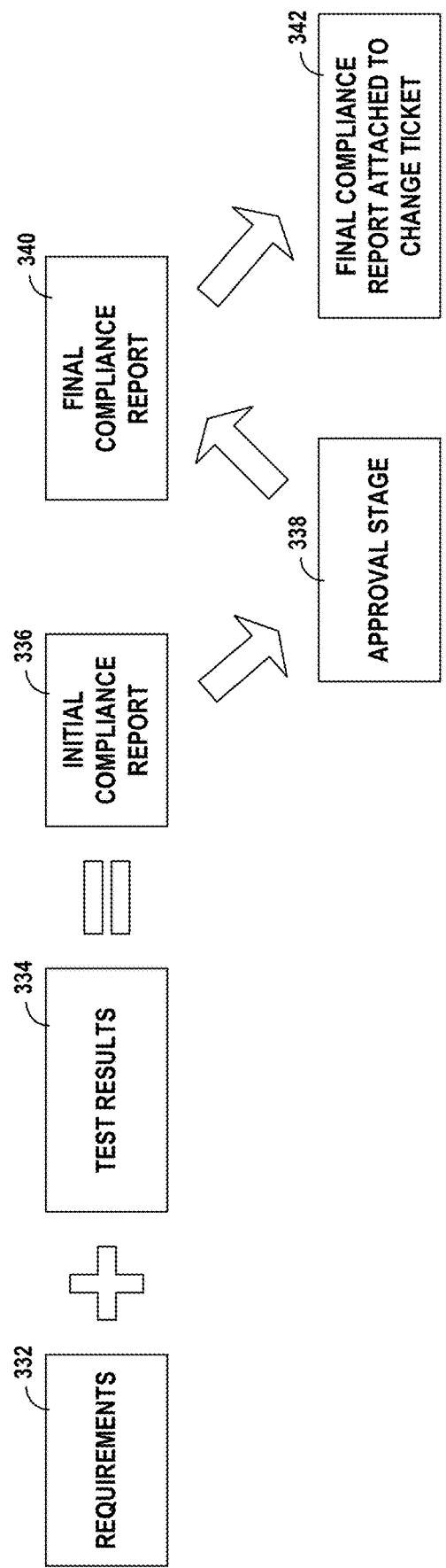
FIG. 3 is a diagram that illustrates a software compliance process for a software compliance report in accordance with one or more aspects of this disclosure.

FIG. 3 is a diagram that illustrates a software compliance process for a software compliance reports in accordance with one or more aspects of this disclosure. Requirements 332 may be software requirements that specify what the software does and how the software behaves. Software requirements may be or include one or more user stories which are short, simple descriptions of a feature told from the perspective of the person who desires the new capability, usually a user or customer of the system. Requirements 332 may be obtained from a software change workflow module 116, such as a software development or project tool (e.g., a source control tool, Continuous Integration/Continuous Deployment tool, project management tool, etc.)

Test results 334 may be automated test results concerning a software change produced by a software development or project tool such as a Continuous Integration/Continuous Deployment tool. Test results 334 may be validated according to standards, such as a user-defined pass/fail threshold. For example, a test result field of test results 334 may give test success in terms of percentage and the validation may use a threshold, such as 100%. A computing system (e.g., computing system 102 or another computing system) may produce an initial compliance report 336 using requirements 332 and test results 334. In approval stage 338, reviewers review initial compliance report 336 and determine whether to accept initial compliance report 336. Upon acceptance, the initial compliance report 336 is now a final compliance report (e.g., final compliance report 340). The computing system may then store final compliance report 340. In some examples, the computing system may attach final compliance report 340 to a change ticket to form final compliance report attached to change ticket 342

FIGS. 4A-4D are diagrams that illustrate an example software compliance report in accordance with one or more aspects of this disclosure. FIG. 4A is a tab that shows example requirements, acceptance criteria, reviewers and acceptance dates. In this example, a requirements tool or other software tool, such as requirements tool 550 shown in FIG. 5A discussed below, is leveraged to get IDs, descriptions, acceptance criteria and acceptance information. In the example of FIG. 4A, the development tool is Milestone.

FIG. 4B is a tab that shows example test results and security scans. The test results may be obtained from a system such as test system 566 or from test functionality of requirements tool 550, such as Rally, shown in FIG. 5 discussed below. In this example, the pass threshold is set as 100%. The security scan information may be obtained from security scan system 568 of FIG. 5 discussed below.

FIG. 4C is a tab that shows example deployment details. The deployment details may include information from change management tool 552 such as change ticket information and approval information for the change ticket.

FIG. 4D is a tab that provides an example interface that allows for a Separation of Duties attestation. A Separation of Duties attestation enables a team to attest to proper separation of duties for the deployment. Separation of Duties contributes to production integrity by ensuring that those who write the code do not deploy the code.

Figure 5A:
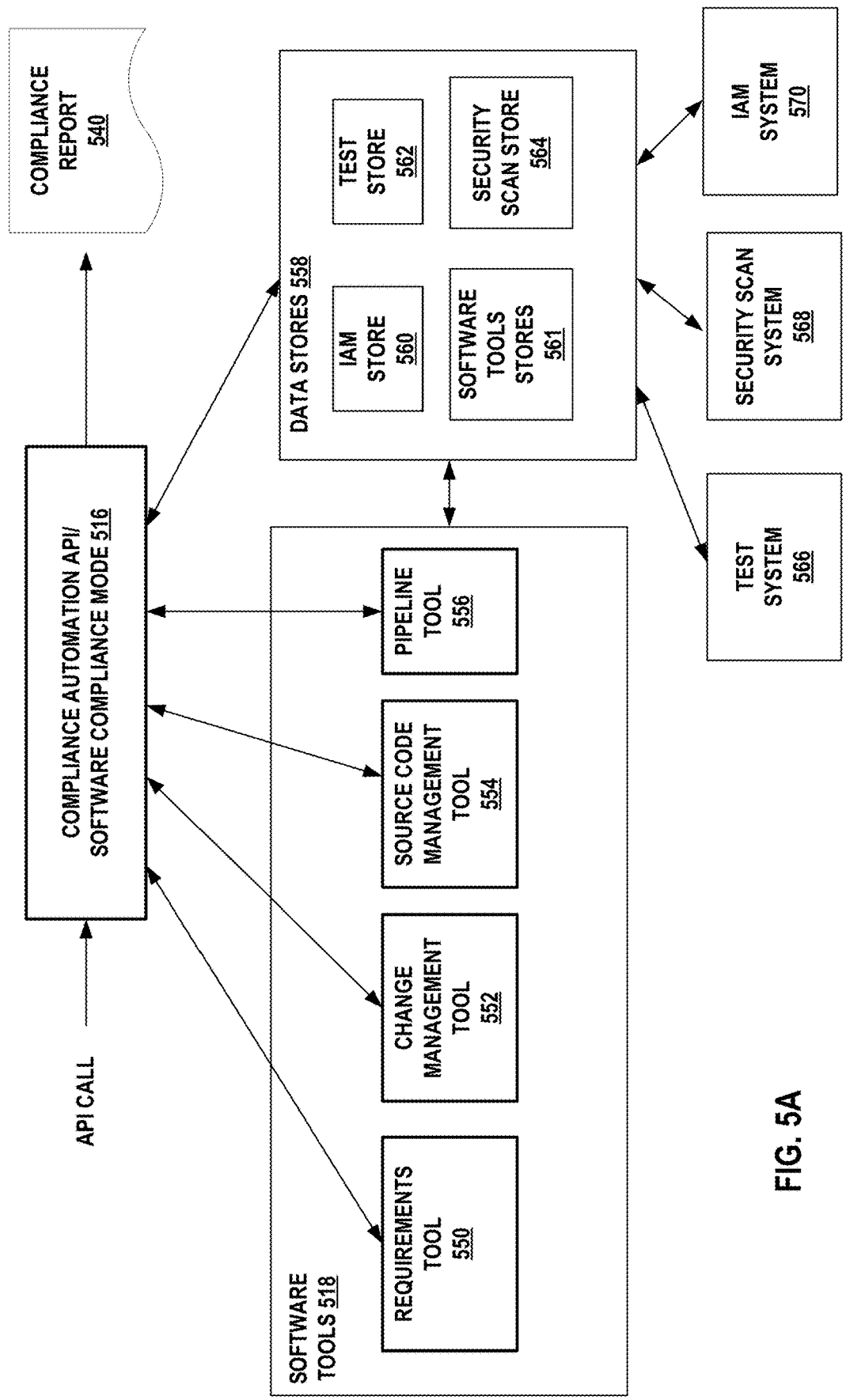
FIG. 5A is a block diagram illustrating an example system that implements a software change workflow and software compliance, in accordance with one or more aspects of this disclosure.

FIG. 5A is a block diagram illustrating an example system that implements a software change workflow and software compliance, in accordance with one or more aspects of this disclosure. Compliance automation API/software compliance mode 516 may create compliance report 540 using the software tools 518, data stores 558, IAM system 570, security scan system 568 and test system 566 as is described in this disclosure.

An API call may be made into compliance automation API/software compliance mode 516. The API call may be made from an interface of one of the software tools 518. The API call may include identifiers such as target deployment ID, change ticket IDs and application IDs. The application ID may identify the software application; the target deployment ID may identify the deployment location, such as production, test etc. The change ticket IDs may identify a change ticket for which compliance automation API/software compliance mode 516 will generate a compliance report. The identifiers may relate to a relevant software tool 518.

Software tools 518 may include requirements tool 550. Requirements tools 550 may automate the execution and tracking of tasks, and is often used in agile software development. Examples of requirements tools include Rally, Jira and Azure DevOps. Requirements tool 550 may integrate with a variety of development tools and platforms, such as other tools of software tools 518.

Change management tool 552 may be used to automate and streamline a change management process. Change management tool 552 may include features such as change request forms, a change log, and integration with other systems, such as other tools of software tools 518. Change management tool 552 may overlap with other tools of the software tools 518 with change management functionality being a part of some of these other tools, such as requirements tool 550. Examples of software tools with change management functionality include ServiceNow, Jira, Zoho Sprints, Atlassian Confluence and Redmine.

Source code management tool 554 may track and manage changes to a software codebase. Source code management tool 554 may use version control to track changes to the code over time, allowing developers to see the full history of the codebase and revert to previous versions if needed. Source code management tool 554 may also include branching and merging, enabling developers to create separate branches of their codebase which may be merged back into the main codebase. Examples of source code management tools include Git, Mercurial, Subversion, and Concurrent Versions System (CVS).

Pipeline tool 556 such as a Continuous Integration/Continuous Deployment (CI/CD) tool may automatically build, test, and deploy code changes. Examples of tools with pipeline functionality include Jenkins, CircleCI, TravisCI and Azure DevOps.

Test system 566 may be used to test software to ensure that it is functioning correctly and store the test results in the test store 562. Test system 566 may be part of or controlled by software tools 518, such as pipeline tool 556.

Security scan system 568 may scan software for security vulnerabilities. Static analysis tools, such as Veracode and Checkmarx, analyze source code or compiled binaries to identify potential vulnerabilities. Dynamic analysis tools, Burp Suite and OWASP ZAP, analyze software as it runs to identify potential vulnerabilities. Security scan system 568 may put the scan results into security scan store 564.

Identity and Access Management (IAM) system 570 may manage and control access to resources within an organization. IAM system 570 may secure networks, applications, and systems by controlling who has access to them and what actions they are allowed to perform. As described in the present disclosure, IAM system 570 may ensure requirement and deployment approvers are valid and leverage the IAM system to identify valid business and IT approvers to demonstrate compliance with deployment best practices, such as separation of duties.

Data stores 558 may store data that may be accessed by compliance automation API/software compliance mode 516. Data stores 558 may include IAM store 560, test store 562, security scan store 564 and software tools stores used by software tools 518. Data stores 558 may be databases, file systems, object stores, key-value stores and document stores.

In one example, Agile story acceptance may be leveraged as the "requirements and testing" approval for compliance. For a given target deployment ID, compliance automation API/software compliance mode 516 may obtain relevant details of user stories, test and story acceptance from a software tool 518, such as the requirements tool 550. Compliance automation API/software compliance mode 516 may validate acceptance criteria of the test and story acceptance from a software tool 518 or from test system 566 against an identified pattern. Compliance automation API/software compliance mode 516 may obtain and validate test results against a pass threshold. Compliance automation API/software compliance mode 516 may validate that the test and story acceptance is from a valid approver using IAM store 560 and IAM system 570.

In another example, IAM system 570 may be leveraged to validate approvers. For a given target deployment ID, compliance automation API/software compliance mode 516 may obtain and validate that a story is accepted by an active member of the "requirements and testing" approver group for compliance. Compliance automation API/software compliance mode 516 may do a point-in-time check at the time of approval to validate that deployment approver is active member of the respective "Deployment-Approver" group. Otherwise, compliance automation API/software compliance mode 516 may send notifications to collect approvals. IAM system 570 may be used to set up approvers in the appropriate IAM group.

In yet another example, compliance automation API/software compliance mode 516 may use upstream approvals as proxies for deployment approvals. For tech approvals, the pull request approval may act as a proxy for the required deployment approval. For a business approval, a story approval may act as proxy. For a business approval, for given target deployment ID, Business auto-approval for deployment may involve 1) a user story being associated with a target deployment ID at requirements tool 550; 2) the user story is accepted by authorized approver at requirements tool 550; 3) deployment approval for business is automatic if the person who accepted the user story in the previous step is validated to be an active member in a "Deployment-Business-Approval" group; otherwise, system falls back to manual business approval. For a tech approval, for given target deployment ID, IT auto-approval for deployment may involve. 1) code change's pull request is associated with target deployment ID in source code management tool 554; 2) Pull request is reviewed and approved by different person other than who wrote code in source code management tool 554; and 3) deployment approval for IT is automatic if the person who approved the code change in step 2 is validated to be an active member in a "Deployment-IT-Approval" group; otherwise, system falls back to manual IT approval.

In yet another example, compliance automation API/software compliance mode 516 may collect execute and report test execution summaries. For a given target deployment ID, users, software tools 518 or test system 566 may create test execution summaries after any test. A standard test summary event may be defined. For example, a standard test summary event may include target deployment ID, application IDs, date, test-type and test results. The standard test summaries may be stored in test store 562 by users, software tools 518 or test system 566. Compliance automation API/software compliance mode 516 may read the latest test execution summaries from the test store 562 for the relevant deployment as indicated by target deployment ID. Compliance automation API/software compliance mode 516 may automatically validate test results against a pass threshold. For example, the pass threshold for a test result field may be 100% and any results less than that may fail validation.

In yet another example, compliance automation API/software compliance mode 516 may collect validate and report security scans in the compliance report. For a given target deployment ID, for every application involved in the deployment (as identified by application ID), compliance automation API/software compliance mode 516 may get all available security scans, risk and actions information and include them in the report. Compliance automation API/software compliance mode 516 may obtain security scans from security scan store 564 and security scan system 568. The validation may be done using a threshold or by using pass fail criterion.

In yet another example, compliance automation API/software compliance mode 516 may integrate with change management tool 552 to store the compliance report 540 with the change ticket. For a given target deployment ID, compliance automation API/software compliance mode 516 may get change ticket and associated information from change management tool 552 or from software tools stores 561. Compliance automation API/software compliance mode 516 may validate to ensure that compliance report is being run before the change time, and state of the change ticket is appropriate to proceed. Compliance automation API/software compliance mode 516 may validate that every application in compliance report 540 exists in the change ticket configuration. Compliance automation API/software compliance mode 516 may attach a final approved and protected compliance report to the change ticket as a record for auditors.

In yet another example, compliance automation API/software compliance mode 516 may be part of compliance automation that compiles, validates, creates and stores compliance artifacts. Compliance automation API/software compliance mode 516 may be triggered from an interface of a software tool 518, from a bot, or from a scripted or manual Representational State Transfer (REST) API call. Compliance automation API/software compliance mode 516 may read groups and user information and change ticket details are read from data stores 558 and tools and the groups and user information and change ticket details may be validated against the input to the compliance automation API/software compliance mode 516. For example, compliance automation API/software compliance mode 516 may read groups and user information from IAM system 570 or IAM store 560 and may read change ticket details from change management tool 552 or software tools stores 561. Compliance automation API/software compliance mode 516 may obtain information for compliance reports from different source systems (requirements, test results, security scans etc.). For example, requirements and any test information may be read from requirements tool 550 or software tools stores 561; test summaries may be read from test system 566 or test store 562, security scans may be read from security scan store 564 or security scan system 568. Compliance automation API/software compliance mode 516 may generate an initial compliance report approval. Compliance automation API/software compliance mode 516 may collect approvals and generate the final report. Compliance automation API/software compliance mode 516 may send the final report to the appropriate groups/users, attach the final report to a change ticket and store the final compliance report in an events store.

Figure 5B:
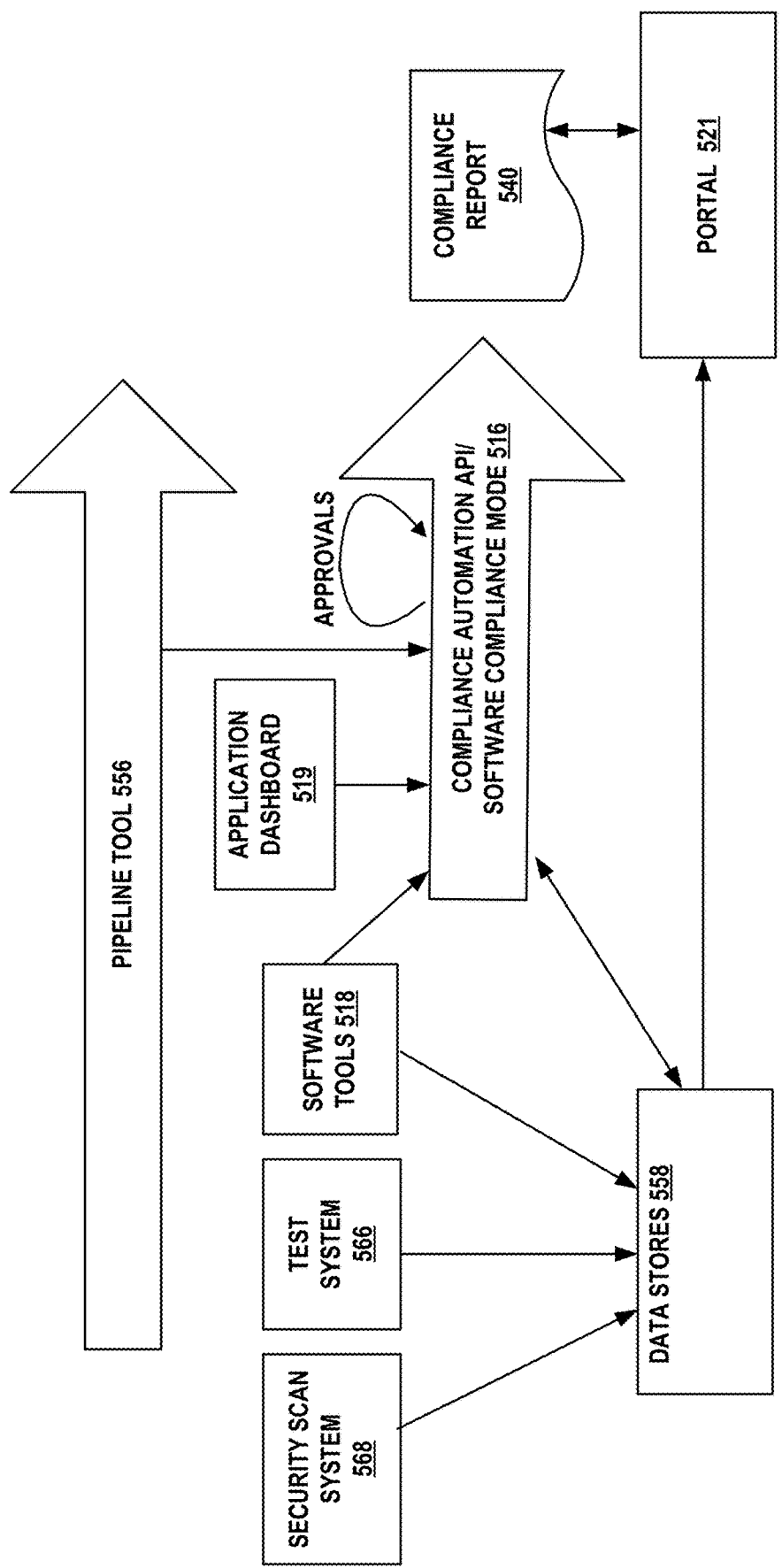
FIG. 5B is a block diagram illustrating a flow of a software change workflow and software compliance, in accordance with one or more aspects of this disclosure.

FIG. 5B is a block diagram illustrating a flow of a software change workflow and software compliance, in accordance with one or more aspects of this disclosure. Compliance automation API/software compliance mode 516 may obtain information from pipeline tool 556, data stores 558, software tools 518 and application dashboard 519. Application dashboard 519 may be a user interface that displays real-time data and information about the performance, usage, and status of a particular application or system. Application dashboard 519 may be used to monitor and manage the application and provide users with a quick and easy way to access important data and perform key tasks. Application dashboard 519 may be customized to display various metrics, such as user activity, system performance, and data usage, and can be accessed from various devices. Application dashboard 519 may be one of the software tools 518.

Data stores 558 may receive test information from test system 566, security scans from security scan system 568 as well as information from software tools 518. Software tools 518 may include requirements tool 550, change management tool 552, source code management tool 554 and pipeline tool 556 as shown in FIG. 5A, as well as application dashboard 519.

Compliance automation API/software compliance mode 516 may obtain the necessary information and approvals to produce compliance report 540. Portal 521 may allow access to compliance report 540. Portal 521 may be a reporting hub, business intelligence (BI) portal, or other system. A reporting hub is a centralized location or platform where various reports and data can be accessed and viewed. The main goal of a reporting hub is to provide a single location for users to access the data and reports they need in order to make informed decisions. A business intelligence portal is a web-based platform that provides users with access to data, reports, and analytics tools to support decision-making and strategic planning within an organization.

Figure 6:
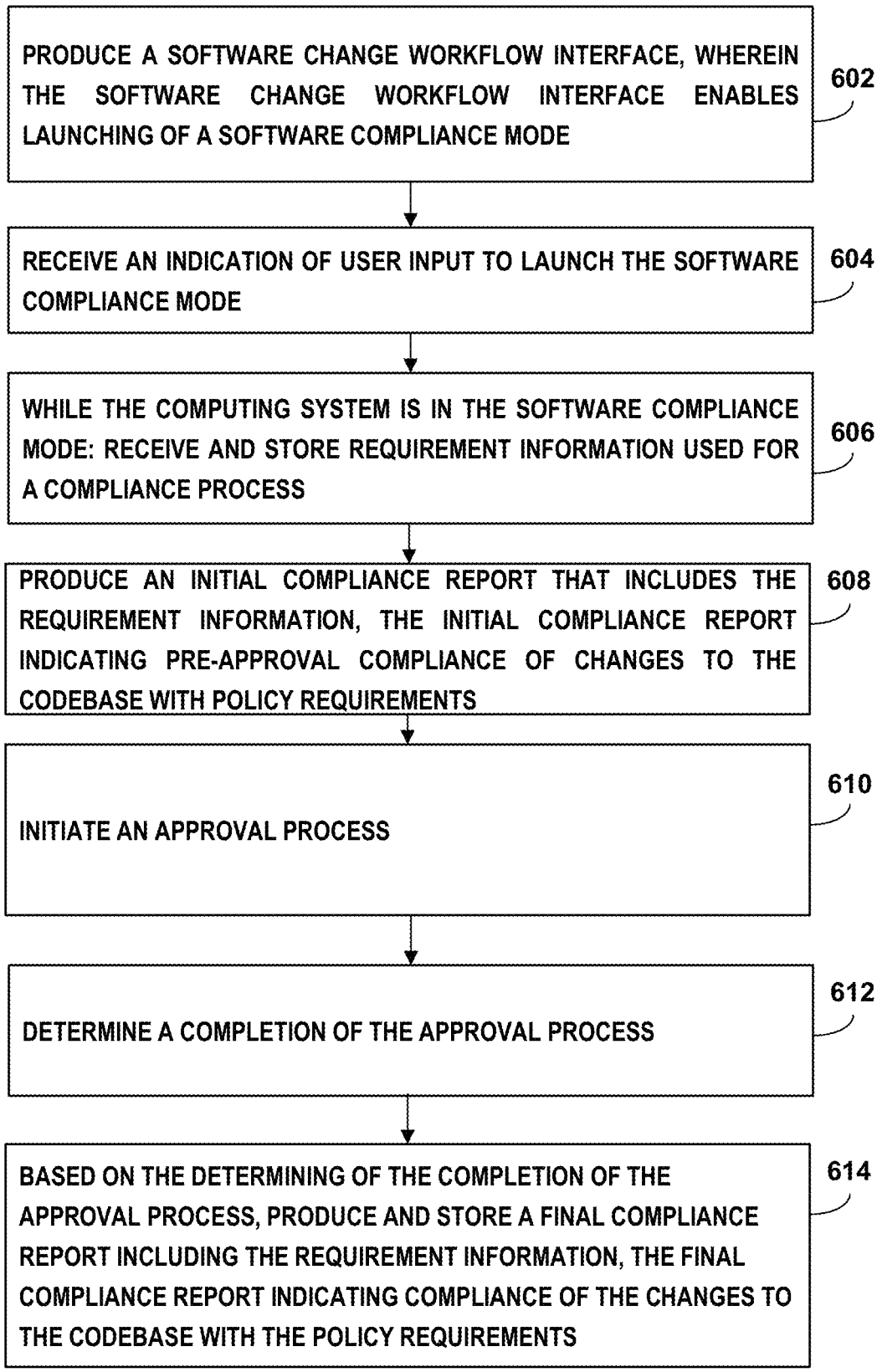
FIG. 6 is a flowchart that illustrates a method in accordance with one or more aspects of this disclosure.

FIG. 6 is a flowchart that illustrates a method in accordance with one or more aspects of this disclosure. FIG. 6 is described below in the context of user computing system 102 of FIG. 1 and user computing system 202 of FIG. 2.

As shown in FIG. 6, computing system 202 may produce a software change workflow interface, wherein the software change workflow interface enables launching of a software compliance mode (602). The interface may be from a software tool discussed in FIG. 5, such as requirements tool 550 or source management tool 554. Computing system 202 may receive an indication of user input to launch the software compliance mode (604). The computing system may receive an API that includes identifiers such as target deployment ID, change ticket IDs and application IDs.

While the computing system 202 is in the software compliance mode computing system 202 may do additional operations. Computing system 202 may receive and store requirement information used for a compliance process (606). For example, the identifiers may be used to access information from software tools 518 or data stores 558 used to produce a compliance report. Computing system 202 may produce an initial compliance report that includes the requirement information, the initial compliance report indicating pre-approval compliance of changes to a codebase with policy requirements (608). Details of an example compliance report construction are discussed above with respect to FIG. 5A. Computing system 202 may initiate an approval process (610). Computing system 202 may receive an indication of approval from the reviewer (612).

Computing system 202 may send a message to a reviewer to request approval of the initial compliance report, the message enabling the reviewer to access the initial compliance report. Computing system 202 may determine the completion of the approval process by receiving, at the computing system, an indication of approval from the reviewer. For example, computing system 202 may send emails to the approvers with a link to the initial compliance report so that approvers may accept the compliance report.

Computing system 202 may determine the completion of the approval process by identifying approval from another system and using the approval as a proxy approval for the compliance process.

Based on the determining of the completion of the approval process, computing system 202 produce and store a final compliance report including the requirement information, the final compliance report indicating compliance of the changes to the codebase with the policy requirements (614). For example, the final report may be stored in data store 558 of FIG. 5, associated with a change ticket in change management tool 552 and sent to user's in an email.

The following is a non-limiting list of examples that are in accordance with one or more techniques of this disclosure.

Example 1: A method comprising: producing, by a computing system, a software change workflow interface, wherein the software change workflow interface enables launching of a software compliance mode; receiving, by the computing system, an indication of user input to launch the software compliance mode; while the computing system is in the software compliance mode: receiving and storing, by the computing system, requirement information used for a compliance process; producing an initial compliance report that includes the requirement information, the initial compliance report indicating pre-approval compliance of changes to a codebase with policy requirements; initiating, by the computing system, an approval process; determining, by the computing system, a completion of the approval process; and based on the determining of the completion of the approval process, producing and storing, by the computing system, a final compliance report including the requirement information, the final compliance report indicating compliance of the changes to the codebase with the policy requirements.

Example 2: The method of example 1, wherein the initiating the approval process includes sending, by the computing system, a message to a reviewer to request approval of the initial compliance report, the message enabling the reviewer to access the initial compliance report; and wherein the determining of the completion of the approval process includes receiving, at the computing system, an indication of approval from the reviewer.

Example 3: The method of example 2, wherein the reviewer is authenticated before allowing the reviewer to approve the initial compliance report.

Example 4. The method of example 1, wherein the determining of the completion of the approval process includes identifying approval from another system and using the approval as a proxy approval for the compliance process.

Example 5: The method of examples 1-4, further comprising receiving and storing, by the computing system, test results, wherein the final compliance report includes the test results.

Example 6: The method of examples 1-5, further comprising receiving and storing, by the computing system, security scan, wherein the final compliance report includes the security scan.

Example 7: The method of examples 1-6, wherein producing, by the computing system, the final compliance report comprises producing the final compliance report according to a standardized format that the computing system uses to produce other final compliance reports.

Example 8: The method of examples 1-7, further comprising providing, by the computing system, to an authorized auditor, access to the final compliance report along with other final compliance reports in a review interface.

Example 9: The method of examples 1-8, wherein the method further comprises, while the computing system is in the software compliance mode, using, by the computing system, an application programming interface (API) to produce the initial compliance report and the final compliance report from the software change workflow interface.

Example 10: The method of examples 1-9, wherein the software change workflow interface enables Agile software development and wherein the software compliance mode enables the production of the final compliance report as part of the Agile software development.

Example 11: The method of examples 1-10, wherein the changes to the codebase relate to a change ticket, and wherein producing and storing, by the computing system, the final compliance report associates the final compliance report with the change ticket.

Example 12: The method of example 11, further comprising producing a page for the change ticket that enables the final compliance report to be accessed.

Example 13: The method of examples 1-12, further comprising receiving and storing additional documents, wherein producing the initial compliance report includes associating the additional documents with the initial compliance report and producing the final compliance report includes associating the additional documents with the final compliance report.

Example 14: A computing system comprising: a communication unit configured to connect with a network; and one or more processors implemented in circuitry and in communication with the communication unit, the one or more processors configured to: produce a software change workflow interface, wherein the software change workflow interface enables launching of a software compliance mode; receive an indication of user input to launch the software compliance mode; while the computing system is in the software compliance mode: receive and store requirement information used for a compliance process; produce an initial compliance report that includes the requirement information, the initial compliance report indicating pre-approval compliance of changes to a codebase with policy requirements; initiate an approval process; determine a completion of the approval process; and based on the determining of the completion of the approval process, produce and store a final compliance report including the requirement information, the final compliance report indicating compliance of the changes to the codebase with the policy requirements.

Example 15: The computing system of example 14, wherein the initiating the approval process includes sending, by the computing system, a message to a reviewer to request approval of the initial compliance report, the message enabling the reviewer to access the initial compliance report; and wherein the determining of the completion of the approval process includes receiving, at the computing system, an indication of approval from the reviewer.

Example 16: The computing system of example 15, wherein the reviewer is authenticated before allowing the reviewer to approve the initial compliance report.

Example 17: The computing system of example 14, wherein the determining of the completion of the approval process includes identifying approval from another system and using the approval as a proxy approval for the compliance process.

Example 18: The computing system of examples 14-17, further comprising receiving and storing, by the computing system, test results, wherein the final compliance report includes the test results.

Example 19: The computing system of examples 14-18, further comprising receiving and storing, by the computing system, security scan, wherein the final compliance report includes the security scan.

Example 20 The computing system of examples 14-19, wherein the one or more processors configured to produce the final compliance report are configured to produce the final compliance report according to a standardized format that the computing system uses to produce other final compliance reports.

Example 21. The computing system of examples 14-20, wherein the one or more processors are further configured to provide, to an authorized auditor, access to the final compliance report along with other final compliance reports in a review interface.

Example 22. The computing system of examples 14-21, wherein the one or more processors are further configured to, while in the software compliance mode, use an application programming interface (API) to produce the initial compliance report and the final compliance report from the software change workflow interface.

Example 23. The computing system of examples 14-22, wherein the software change workflow interface enables Agile software development and wherein the software compliance mode enables the production of the final compliance report as part of the Agile software development.

Example 24: The computing system of examples 14-23, wherein the changes to the codebase relate to a change ticket, and wherein the one or more processors are further configured to associate the final compliance report with the change ticket.

Example 25: The computing system of example 24, further comprising producing a page for the change ticket that enables the final compliance report to be accessed.

Example 26: The computing system of examples 14-25, further comprising receiving and storing additional documents, wherein producing the initial compliance report includes associating the additional documents with the initial compliance report and producing the final compliance report includes associating the additional documents with the final compliance report.

Example 27 A non-transitory computer-readable medium having instructions stored thereon that, when executed, cause one or more processors to: produce a software change workflow interface, wherein the software change workflow interface enables launching of a software compliance mode; receive an indication of user input to launch the software compliance mode; while the computing system is in the software compliance mode: receive and store requirement information used for a compliance process; produce an initial compliance report that includes the requirement information, the initial compliance report indicating pre-approval compliance of changes to a codebase with policy requirements; initiate an approval process; determine a completion of the approval process; and based on the determining of the completion of the approval process, produce and store a final compliance report including the requirement information, the final compliance report indicating compliance of the changes to the codebase with the policy requirements.

Example 28: The non-transitory computer-readable medium of example 27, wherein the initiating the approval process includes sending, by the computing system, a message to a reviewer to request approval of the initial compliance report, the message enabling the reviewer to access the initial compliance report; and wherein the determining of the completion of the approval process includes receiving, at the computing system, an indication of approval from the reviewer.

Example 29: The non-transitory computer-readable medium of example 28, wherein the reviewer is authenticated before allowing the reviewer to approve the initial compliance report.

Example 30: The non-transitory computer-readable medium of example 27, wherein the determining of the completion of the approval process includes identifying approval from another system and using the approval as a proxy approval for the compliance process.

Example 31: The non-transitory computer-readable medium of examples 27-30, further comprising receiving and storing, by the computing system, test results, wherein the final compliance report includes the test results.

Example 32: The non-transitory computer-readable medium of examples 27-31, further comprising receiving and storing, by the computing system, security scan, wherein the final compliance report includes the security scan.

Example 33 The non-transitory computer-readable medium of examples 27-32, wherein the one or more processors configured to produce the final compliance report are configured to produce the final compliance report according to a standardized format that the computing system uses to produce other final compliance reports.

Example 34. The non-transitory computer-readable medium of examples 27-33, wherein the one or more processors are further configured to provide, to an authorized auditor, access to the final compliance report along with other final compliance reports in a review interface.

Example 35. The non-transitory computer-readable medium of example 27-34, wherein the one or more processors are further configured to, while in the software compliance mode, use an application programming interface (API) to produce the initial compliance report and the final compliance report from the software change workflow interface.

Example 36. The non-transitory computer-readable medium of example 27-35, wherein the software change workflow interface enables Agile software development and wherein the software compliance mode enables the production of the final compliance report as part of the Agile software development.

Example 37: The non-transitory computer-readable medium of example 27-36, wherein the changes to the codebase relate to a change ticket, and wherein the one or more processors are further configured to associate the final compliance report with the change ticket.

Example 38: The non-transitory computer-readable medium of example 37, further comprising producing a page for the change ticket that enables the final compliance report to be accessed.

Example 39: The non-transitory computer-readable medium of example 27-38, further comprising receiving and storing additional documents, wherein producing the initial compliance report includes associating the additional documents with the initial compliance report and producing the final compliance report includes associating the additional documents with the final compliance report.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that may be accessed by one or more computers, processing circuitry, or one or more processors to retrieve instructions, code and/or data structures for implementation of the techniques described in this disclosure. A computer program product may include a computer-readable medium.

By way of example, and not limitation, such computer-readable storage media may include RAM, ROM, EEPROM, CD-ROM, or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by processing circuitry (e.g., one or more processors, such as one or more DSPs, general purpose microprocessors, ASICs, FPGAs, or other equivalent integrated or discrete logic circuitry), as well as any combination of such components. Accordingly, the term "processor" or "processing circuitry" as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computer-implemented method comprising:
producing, by one or more processors of a computing system, a software change workflow interface, wherein the software change workflow interface enables launching of a software compliance mode;
receiving, by the one or more processors, an indication of user input to launch the software compliance mode;
while the computing system is in the software compliance mode and as part of an automated compliance report production:
receiving and storing, by the one or more processors, requirement information used for a compliance process and produced by an automated continuous integration/continuous deployment (CI/CD) software pipeline;
producing, by the one or more processors, an initial compliance report that includes the requirement information, the initial compliance report indicating pre-approval compliance of changes to a codebase with policy requirements;
initiating, by the one or more processors, an approval process that includes obtaining proxy deployment approvals for deployment auto-approval;
determining, by the one or more processors, a completion of the approval process; and
based on the determining of the completion of the approval process, producing and storing, by the one or more processors, a final compliance report including the requirement information, the final compliance report indicating compliance of the changes to the codebase with the policy requirements.

2. The computer-implemented method of claim 1, wherein the initiating of the approval process comprises sending a message to a reviewer to request approval of the initial compliance report, the message enabling the reviewer to access the initial compliance report; and wherein the determining of the completion of the approval process receiving an indication of approval from the reviewer.

3. The computer-implemented method of claim 2, wherein the reviewer is authenticated before allowing the reviewer to approve the initial compliance report.

4. The computer-implemented method of claim 1, wherein the determining of the completion of the approval process comprises using a proxy approval for the compliance process.

5. The computer-implemented method of claim 1, further comprising receiving and storing, by the one or more processors, test results, wherein the final compliance report includes the test results.

6. The computer-implemented method of claim 1, further comprising receiving and storing, by the one or more processors, a security scan, wherein the final compliance report includes the security scan.

7. The computer-implemented method of claim 1, wherein producing the final compliance report comprises producing the final compliance report according to a standardized format that the computing system uses to produce other final compliance reports.

8. The computer-implemented method of claim 1, further comprising providing, by the one or more processors, to an authorized auditor, access to the final compliance report along with other final compliance reports in a review interface.

9. The computer-implemented method of claim 1, further comprising, while the computing system is in the software compliance mode, using, by the one or more processors, an application programming interface (API) to produce the initial compliance report and the final compliance report from the software change workflow interface.

10. The computer-implemented method of claim 1, wherein the software change workflow interface enables Agile software development and wherein the software compliance mode enables production of the final compliance report as part of the Agile software development.

11. The computer-implemented method of claim 1, wherein the changes to the codebase relate to a change ticket, and wherein the producing and the storing the final compliance report comprises associating the final compliance report with the change ticket.

12. The computer-implemented method of claim 11, further comprising producing, by the one or more processors, a page for the change ticket that enables the final compliance report to be accessed.

13. The computer-implemented method of claim 1, further comprising receiving and storing, by the one or more processors, additional documents, wherein producing the initial compliance report associating the additional documents with the initial compliance report and the producing the final compliance report comprises associating the additional documents with the final compliance report.

14. A computing system comprising:
one or more processors implemented in circuitry; and
one or more memories storing processor-executable instructions that, when executed by the one or more processors, cause the one or more processors to perform operations comprising:
producing a software change workflow interface, wherein the software change workflow interface enables launching of a software compliance mode;
receiving an indication of user input to launch the software compliance mode;
while the computing system is in the software compliance mode and as part of an automated compliance report production:
receiving and storing requirement information used for a compliance process and produced by an automated continuous integration/continuous deployment (CI/CD) software pipeline;
producing an initial compliance report that includes the requirement information, the initial compliance report indicating pre-approval compliance of changes to a codebase with policy requirements;
initiating an approval process that includes obtaining proxy deployment approvals for deployment auto-approval;
determining a completion of the approval process; and
based on the determining of the completion of the approval process, produce producing and storing a final compliance report including the requirement information, the final compliance report indicating compliance of the changes to the codebase with the policy requirements.

15. The computing system of claim 14, wherein the initiating of the approval process comprises sending a message to a reviewer to request approval of the initial compliance report, the message enabling the reviewer to access the initial compliance report; and wherein the determining of the completion of the approval process comprises receiving an indication of approval from the reviewer.

16. The computing system of claim 14, wherein the determining of the completion of the approval process comprises using a proxy approval for the compliance process.

17. The computing system of claim 14, wherein the operations further comprise receiving and storing test results, wherein the final compliance report includes the test results.

18. The computing system of claim 14, wherein the operations further comprise receiving and storing a security scan, wherein the final compliance report includes the security scan.

19. The computing system of claim 14, wherein the producing the final compliance report comprises producing the final compliance report according to a standardized format that the computing system uses to produce other final compliance reports.

20. One or more non-transitory computer-readable storage media having processor-executable instructions stored thereon that, when executed by one or more processors of a computing system, cause the one or more processors to:
produce a software change workflow interface, wherein the software change workflow interface enables launching of a software compliance mode;
receive an indication of user input to launch the software compliance mode;
while the computing system is in the software compliance mode and as part of an automated compliance report production:
receive and store requirement information used for a compliance process and produced by an automated continuous integration/continuous deployment (CI/CD) software pipeline;
produce an initial compliance report that includes the requirement information, the initial compliance report indicating pre-approval compliance of changes to a codebase with policy requirements;
initiate an approval process that includes obtaining proxy deployment approvals for deployment auto-approval;
determine a completion of the approval process; and
based on the determination of the completion of the approval process, produce and store a final compliance report including the requirement information, the final compliance report indicating compliance of the changes to the codebase with the policy requirements.

* * * * *